United States Patent [19]

Deem et al.

[11] 4,412,605
[45] Nov. 1, 1983

[54] ENGINE FAN CLUTCH

[75] Inventors: Brian C. Deem, Avon Lake; Richard J. Reitz, Amherst, both of Ohio

[73] Assignee: The Bendix Corporation, Southfield, Mich.

[21] Appl. No.: 218,902

[22] Filed: Dec. 22, 1980

[51] Int. Cl.³ .................. F16D 43/25; F16D 43/04
[52] U.S. Cl. .................. 192/82 T; 192/36; 192/83; 192/93 A; 192/94; 192/104 C
[58] Field of Search .................. 192/82 T, 104 C, 35, 192/36, 54, 83, 93 A, 94, 104 R

[56] References Cited

U.S. PATENT DOCUMENTS

| | | | |
|---|---|---|---|
| 2,057,742 | 10/1936 | Russell | 192/36 |
| 2,061,787 | 11/1936 | Warner | 192/35 X |
| 2,657,852 | 11/1953 | Spase | 192/104 C X |
| 2,702,107 | 2/1955 | Hahn | 192/54 X |
| 2,762,482 | 9/1956 | Davis | 192/104 C |
| 2,816,636 | 12/1957 | Weibel | 192/93 A X |
| 2,820,440 | 1/1958 | Jacobs | 192/82 T |
| 2,955,680 | 10/1960 | Caero | 188/77 R X |
| 2,972,398 | 2/1961 | Davis | 192/82 T X |
| 3,055,474 | 9/1962 | Ferris et al. | 192/82 T |
| 3,677,377 | 7/1972 | Miller | 192/35 X |
| 3,724,619 | 4/1973 | Miller | 192/35 X |
| 3,858,697 | 1/1975 | Brewer et al. | 192/82 T X |
| 3,924,716 | 12/1975 | Brewer | 192/104 C X |
| 3,985,214 | 10/1976 | Hall et al. | 192/91 A |

FOREIGN PATENT DOCUMENTS

| | | |
|---|---|---|
| 275084 | 8/1927 | United Kingdom . |
| 863318 | 3/1961 | United Kingdom . |
| 910349 | 11/1962 | United Kingdom . |
| 1147197 | 4/1969 | United Kingdom . |
| 1167774 | 10/1969 | United Kingdom . |
| 1226572 | 3/1971 | United Kingdom . |
| 1264691 | 2/1972 | United Kingdom . |

Primary Examiner—Rodney H. Bonck
Attorney, Agent, or Firm—Ken C. Decker; W. N. Antonis

[57] ABSTRACT

A fan clutch for a vehicle engine connects the engine cooling fan with the engine when the cooling effect of the engine fan is necessary and disconnects the fan when its cooling effect is not necessary. The clutch includes a driven member and a driving member and a belt carried by the driving member and rotatable therewith which is adapted to engage the driven member when the clutch is to be engaged. The driven member comprises a pair of relatively rotatable, axially extensible portions, so that when the belt is in driving engagement with the driven member, relative rotation between the portionsextends the same so that engagement surfaces on one of the portions and on the driving member are brought into engagement, thus connecting the driven and driving members. A spring, which is responsive to centrifugal forces generated by rotation of the driving member, holds the belt in driving engagement with the driven member when engine speeds are below a predetermined level, but yields to permit the belt to move out of engagement with the driven member when engine speed exceeds the predetermined level. A temperature responsive capsule includes a lever which holds the spring in a position maintaining engagement of the belt with the driven member when the temperature level exceeds a predetermined level, regardless of engine speed.

13 Claims, 6 Drawing Figures

4,412,605

ENGINE FAN CLUTCH

BACKGROUND OF THE INVENTION

This invention relates to a fan clutch drive for a vehicle engine.

Because of the high cost of fuel, and because of governmental noise regulations, it is desirable to provide a fan clutch which disconnects the engine cooling fan when its cooling effect is not necessary, and which connects the fan for operation by the vehicle engine when the engine temperature raises to a point that the cooling effect of the fan is necessary. In many vehicles, the cooling effect of the engine fan is necessary during less than ten percent of the time that the vehicle is operated. When the fan is powered when its cooling effect is not necessary, the power necessary to drive the fan is wasted, thereby increasing fuel consumption. Furthermore, engine cooling fans are inherently noisy, and by disconnecting the fan when it is not necessary, the operating conditions of the vehicle may be quieted. One type of fan clutch which has been highly successful with heavy duty vehicles having air brakes is the clutch disclosed in U.S. Pat. No. 3,985,214, owned by assignee of the present invention. However, this fan clutch design is not compatible with smaller vehicles which do not have air brakes, and which are usually provided with direct driven fans. Typical examples of the type of engines in which a fan clutch made pursuant to the teachings of the present invention may be used are trucks having medium-sized gasoline engines or small diesel engines.

SUMMARY OF THE INVENTION

Therefore, an important object of our invention is to provide a fan clutch for a vehicle engine which permits additional fuel savings over the fuel savings accomplished by existing fan clutches.

Another important object of our invention is to provide a fan clutch with an idle speed dropout feature which disconnects the fan at a fast idle speed, but which provides a thermostatic control which re-engages the fan if the engine temperature increases above a predetermined level.

Another important object of our invention is to provide a fan clutch which is smaller and less expensive than existing fan drive clutches.

Another important object of our invention is to provide a fan clutch which provides a one-to-one drive ratio when the clutch is engaged.

Still another important object of our invention is to provide a fan clutch with improved response time over that in existing fan clutches.

DETAILED DESCRIPTION

Figure 1:
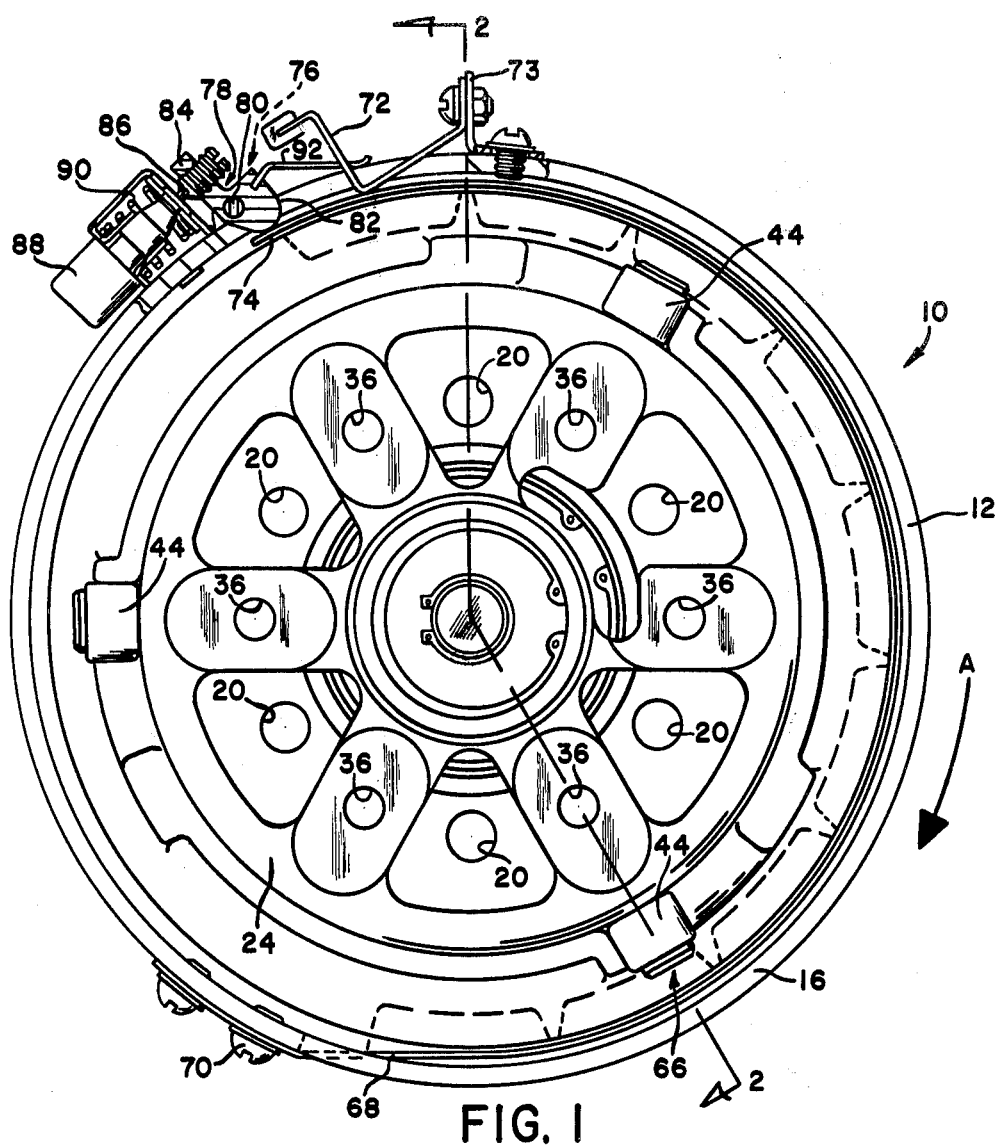
FIG. 1 is a front plan view, partly in section, of the preferred embodiment of a fan clutch made pursuant to the teachings of our present invention.
Figure 3:
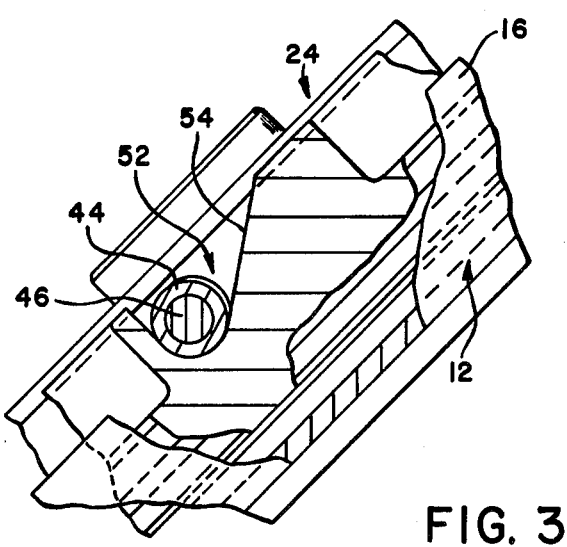
FIG. 3 is a fragmentary view, partly in section, taken substantially along lines 3—3 of FIG. 2.
Figure 2:
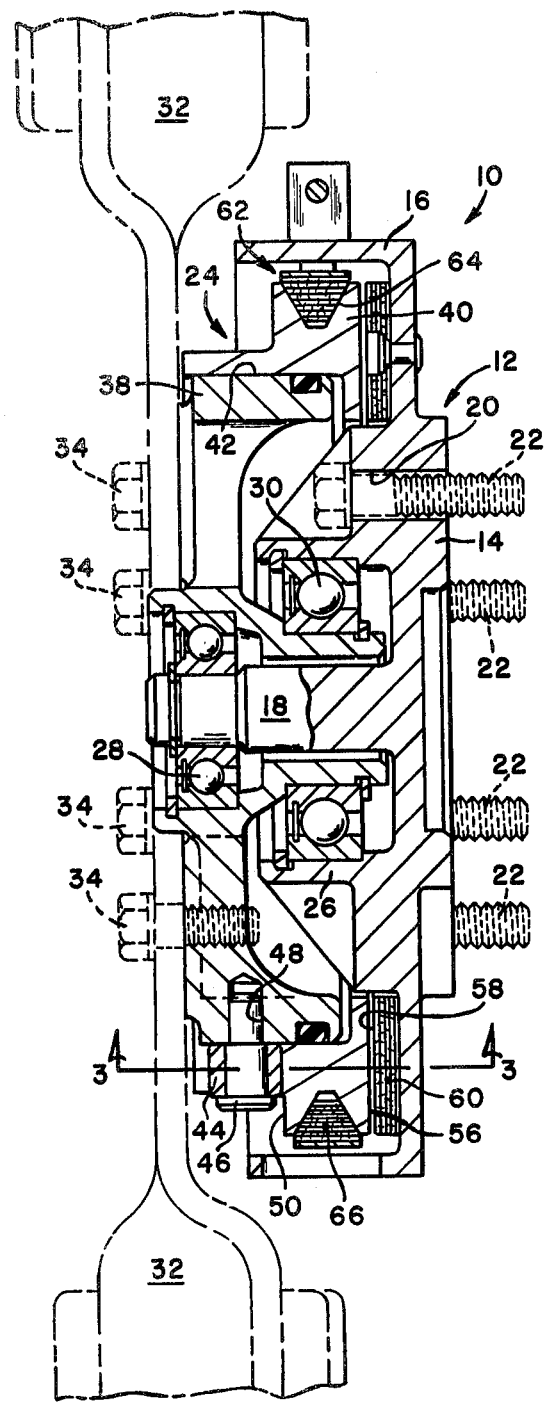
FIG. 2 is a cross-sectional view taken substantially along lines 2—2 of FIG. 1, with the vehicle fan blades shown in phantom.

Referring now to FIGS. 1–3 a fan clutch generally indicated by the numeral 10 includes a driven member 12 having a radially extending portion 14 which terminates in an axially projecting, circumferentially extending section 16. Member 12 also carries an axially projecting spindle 18. Apertures 20 in the radially extending portion 14 are adapted to receive mounting bolts 22 to secure the driving member 12 to a drive pulley, or directly to the crankshaft of the vehicle engine, so that the driving member 12 will be rotated whenever the vehicle engine is operating. The fan clutch 10 is rotated in the direction indicated by the arrow "A".

A driven member generally indicated by the numeral 24 is rotatably mounted on the spindle 18 and on a circumferentially extending portion 26 of the driving member 12 by bearings 28, 30, respectively. Conventional fan blades 32 (shown in phantom in FIG. 2) are attached to the driven member 24 by bolts 34 extending into apertures 36 provided on the member 24. The driven member 24 comprises an inner portion 38 which is rotatably mounted by the bearings 28, 30 as discussed hereinabove, and an outer portion 40 which is supported on the outer circumferential surface 42 of the portion 38 and is rotatable relative thereto. Circumferentially spaced rollers 44 are mounted for rotation about axles 46 which are held against rotation in bores 48 provided on the outer circumferential surface 42 of the portion 38. Accordingly, it will be noted that the axles 46 project radially from the surface 42. The outer edge 50 of the portion 40 of the member 24 is provided with corresponding tapered recesses 52 which receive the rollers 44, as best illustrated in FIG. 3. The recesses 52 are defined by a circumferentially extending, axially tapering camming surface 54. The edge 56 of the portion 40, which is opposite the edge 50, defines an engagement surface which cooperates with a corresponding engagement surface 58 on the radially extending portion 14 of the driving member 12. The surface 58 comprises conventional segments of friction material 60, in a manner well known to those skilled in the art to provide a clutch engagement surface.

The outer circumferential surface of the portion 40 generally indicated by the numeral 62 defines a V-groove 64 which is adapted to receive a driving belt 66. Referring now to FIG. 1, one end 68 of the belt 66 is attached to the axially projecting section 16 of the driving member 12 by screws 70. The belt 66 wraps around the driven member 24 in a direction opposite to that of the direction of rotation of the members indicated by the arrow "A". A spring arm 72 is mounted on a bracket 73 carried by the portion 16 of driving member 12 adjacent the other end 74 of the belt 66, and is adapted to deflect radially with respect to the driving member 12, but normally engages the belt 66 to maintain the latter in the groove 64 when the members 12 and 24 are either stationary or rotating at a very low speed as will be discussed hereinafter.

A bracket 76 is also mounted on the section 16 of driving member 12. The bracket 76 pivotally mounts a lever 78 by pivot connection 80. One end of the lever 78 terminates in a camming surface 82 which is adapted to engage the belt 66 and force the latter into driving engagement with groove 64 as the lever is rotated in the clockwise direction. The opposite end 84 of the lever 78 contacts the plunger 86 of a temperature responsive wax capsule 88. The temperature responsive wax capsule 88 is conventional, and is responsive to ambient air temperature to extend plunger 86 to pivot the lever about the pivot 80. The wax capsule 88 is yieldably mounted on the bracket 76 by a spring 90, so that the capsule 88 can move relative to the bracket 76 after the plunger moves a predetermined distance. A leaf spring 92 yieldably urges the lever 78 in the counterclockwise direction, to provide a return force on the plunger 86.

MODE OF OPERATION OF THE PREFERRED EMBODIMENT

When the vehicle engine is operating at a slow idle, operation of the fan is sometimes necessary to provide engine cooling. Accordingly, the spring arm 72 maintains the belt 66 in engagement with the groove 64, thereby causing the portion 40 of the driven member 24 to rotate with the driving member 12, it being noted, as discussed hereinabove, that the driving member 12 will rotate whenever the engine is operating. The resistance of the fan blades 32 causes the portion 38 of the driven member 24 to resist rotation. Accordingly, since the portion 40 is now rotating with the driving member 12, relative rotation will occur between the portions 38 and 40 of the driven member 24, causing the rollers 44 to be forced up the tapered portion 54 of the camming surface 52. As the rollers are forced up the camming surface 54 due to the relative rotation between the portions 38 and 40, the portion 40 will be forced axially relative to the portion 38, toward the driven member 12, thereby causing the engagement surface 56 on the portion 40 to frictionally engage the engagement surface 58 comprising the friction material 60. When this occurs, the driven member 24 is now in driving engagement with the driving member 12, so that the vehicle engine is now turning the fan blades 32 to cool the engine.

At some predetermined engine speed, centrifugal force acting on the band 66 due to the fact that it rotates with the driving member 12 yieldably urges the belt in a direction radially outwardly with respect to the members 12 and 24. As engine speed increases, the centrifugal force increases, and at some predetermined engine speed, the centrifugal force generated by rotary movement of the belt is sufficient to overcome the force exerted on the belt by the spring arm 72. When this occurs, the spring arm 72 yields, thereby permitting the belt 66 to move radially with respect to the portion 40 to move away from the walls of the V-groove 64. When this occurs, the driving connection between the driving member 12 and the portion 40 through the belt 66 is broken, permitting the rollers 44 to move back down the camming surface 54. The portion 40 is moved axially with respect to the portion 38 to the left viewing FIG. 2, so that the engagement surface 56 moves away from the engagement surface 58, thereby completely breaking the driving connection between the driving and driven members. When this occurs, the only driving connection between blades 32 and the vehicle engine is due to bearing drag, so that only a minimal amount of engine power is wasted driving the fan.

At high engine speeds, if the engine temperature increases sufficiently, the wax capsule 88 reacts, driving the plunger 86 to rotate the lever 78 in the clockwise direction. When this occurs, the lever 78 pivots about the pivot 80, causing the camming surface 82 of the lever 78 to overcome the centrifugal force exerted by the belt 66 rotation with the driving member 12 and thereby urging belt 66 into frictional engagement with the V-groove 64, to re-engage the clutch in the same manner as discussed hereinabove. Accordingly, even at the high engine speed which usually forces the belt into a position overcoming the force of the spring arm 72, the reaction of the wax capsule 88 will re-engage the clutch to cause rotation of the fan. Therefore, the fan will always be engaged whenever either of two conditions are satisfied: either the engine is operating at a relatively low speed, or the engine temperature increases above some predetermined temperature level. It is noted that the clutch mechanism illustrated in FIGS. 1 to 3 is inherently self-adjusting, because upon disengagement of the clutch, the rollers may be forced only part of the way down the camming surface 54. This, of course, compensates for wear of the friction material 60, so that the degree of axial travel required of the portion 40 of driven member 24 remains substantially constant regardless of the width of the friction material 60.

DETAILED DESCRIPTION OF THE FIRST ALTERNATE EMBODIMENT

Figure 4:
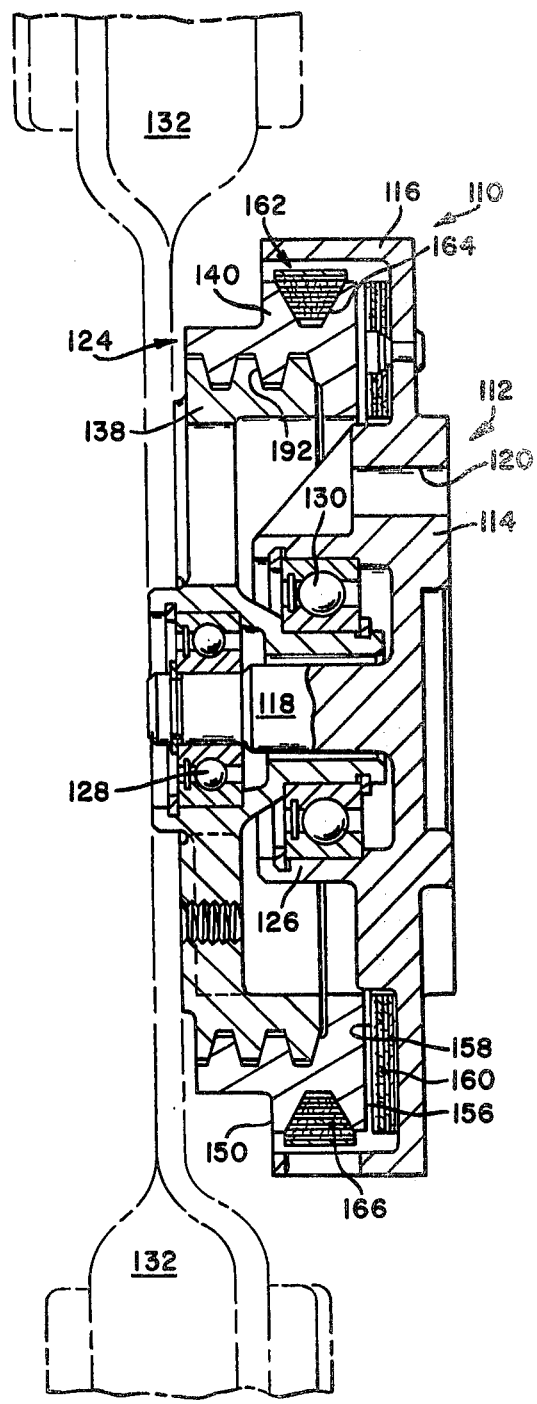
FIG. 4 is a view similar to FIG. 2 of another embodiment of our invention.

Referring now to the embodiment of FIG. 4, elements substantially the same as those in the preferred embodiment retain the same reference character, but increased by 100. The embodiment of FIG. 4 is substantially the same as the preferred embodiment, except that the rollers 44, axles 46, and recesses 52 are replaced by a screw thread generally indicated by the numeral 192 on the portions 138 and 140 of the driven member 124. The lead of the screw threads 192 is at a direction opposite the direction of rotation indicated by the arrow "A", so that the lead of the threads 192 is in the same direction of the force due to the resistance of the fan blades 132 upon actuation of the clutch. Accordingly, the screw threads give a self-energizing effect to the belt drive and force the power screw threads, upon relative rotation between the members 138 and 140, into engagement with the engaging surface 158 on the driving member 112. Again, this design is inherently self-adjusting, since the power screw threads need only retract a very small amount upon release of the clutch in order to break the driving connection.

DETAILED DESCRIPTION OF THE SECOND ALTERNATE EMBODIMENT

Figure 5:
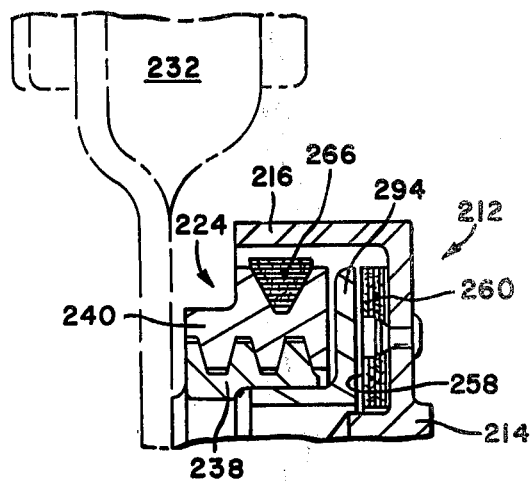
FIG. 5 is a fragmentary view similar to a portion of FIGS. 2 and 4 illustrating still another important embodiment of our invention.

In the embodiment of FIG. 5, elements the same as those in the first alternate embodiment retain the same reference numerals, but are increased by 100. The embodiment of FIG. 5 is similar to the embodiment of FIG. 4, except that an intermediate member 294 is installed between the surfaces 258 and 256. The intermediate member 294 is splined for rotation with the member 238, so that the driving torque is transmitted from any member 212 through intermediate portion 294 and member 238. In the absence of intermediate member 294, driving torque must be transmitted through portion 240, which may be undesirable in some installations.

DETAILED DESCRIPTION OF THE THIRD ALTERNATE EMBODIMENT

Figure 6:
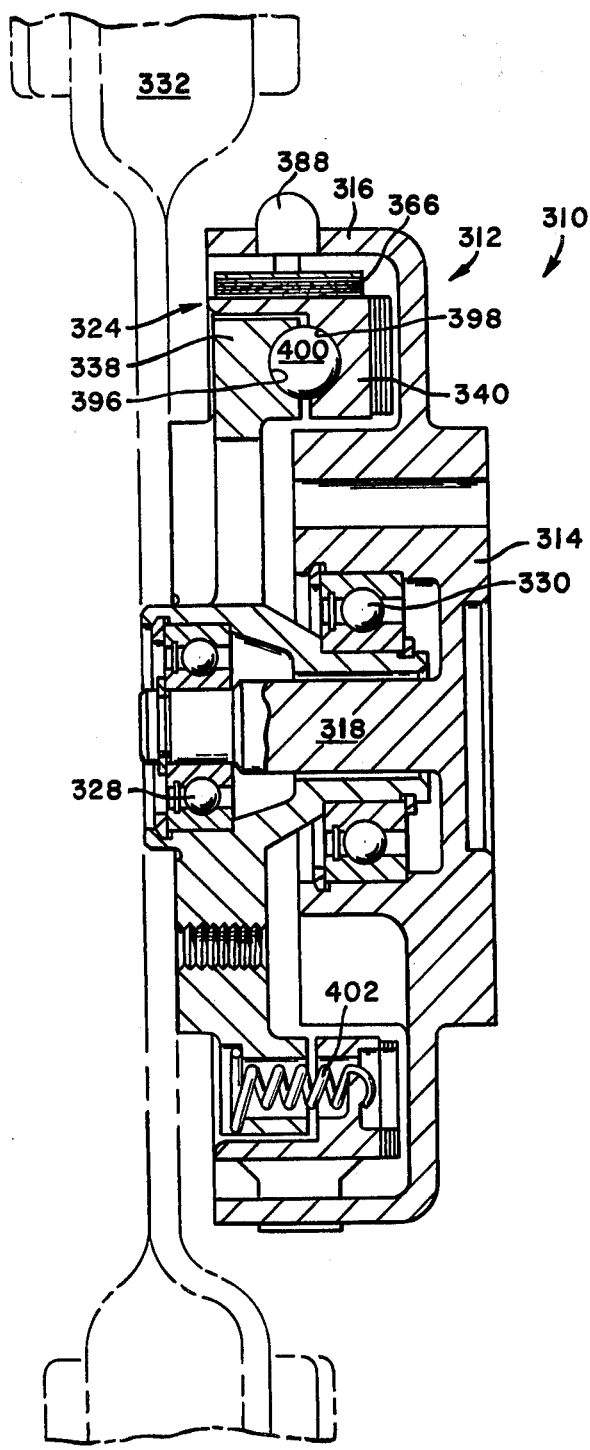
FIG. 6 is a view similar to FIGS. 2 and 4 of still another embodiment of our invention.

Referring now to the embodiment of FIG. 6, elements substantially the same as those in the preferred embodiment retain the same reference character, but increase by 300. The device illustrated in FIG. 6 is substantially the same as the preferred embodiment, except instead of the rollers 44 and camming surfaces 54, circumferentially spaced recesses 396 and 398 are provided in the portions 338 and 340 of the driven member 324. Force transmitting elements or spheres 400 are disposed in the recesses 396, 398, and are urged up the tapered walls thereof upon relative rotation between the portions 338 and 340, to thereby effect axial separation of the portions 338 and 340. The design of the camming surfaces on the recesses 396, 398 is more completely described in U.S. Pat. No. 2,955,680. It will also be noted that a flat belt 366 has been provided in lieu of the V-belt 66 in the preferred embodiment. A spring (not shown) similar to the spring 72 in the preferred embodiment is provided to urge the belt 366 against member 340. A thermal actuator 388 which may be identical to the thermal actuator 88 in the preferred embodiment, is mounted on the driving member 312, and reacts radially against the belt 366, to hold the latter and to engage with the outer circumferential surface of the portion 340 when the clutch is to be engaged. Appropriate return of springs 402 are provided to urge the portion 340 to the left viewing the Figure, when the clutch is to be released. When this occurs, the spheres 400 will fall back into the recesses 396, 398.

I claim:

1. In a clutch, a pair of relatively rotatable coaxial members comprising a driving member and a driven member, said driven member including a pair of axially extensible portions responsive to relative rotation between said portions to effect extension thereof to drivingly engage said members by frictionally engaging one of said portions with said driving member, a flexible elongate belt having a free end and an attached end, means securing said attached end to said driving member for preventing relative movement between the attached end and said driving member, a friction surface carried by one of said portions for engagement by said belt, yieldable means engaging a section of said belt adjacent the free end thereof to hold said section into frictional engagement with said friction surface, said yieldable means yielding to movement of said section of said belt against said yieldable means due to centrifugal forces on said belt generated by rotation of said driving member above a predetermined speed, the portion of said belt between said section and said attached end flexing in response to relative movement between said section and said attached end when the latter is urged against said friction surface whereby said portion of said belt is also forced into frictional engagement with said friction surface as the clutch is engaged, and temperature responsive means carried by the driving member for engaging said section of said belt to hold the latter in frictional engagement with said friction surface when the temperature sensed by said temperature responsive means is above a predetermined level.

2. The invention of claim 1 wherein said yieldable means is a spring arm carried by said driving member.

3. The invention of claim 1 wherein said belt wraps around the driven member in a direction opposite to the direction of rotation of said driving member.

4. The invention of claim 1 wherein said temperature responsive means includes a lever pivotally mounted on said driving member and an expansion member for pivoting said lever said expansion member expanding in response to an increase in temperature.

5. The invention of claim 4 wherein said lever carries a camming surface for engagement with said section of the belt.

6. The invention of claim 1, said driven and driving members having complementary, radially projecting, circumferentially extending engagement surfaces thereon, and friction material on one of said surfaces, said surfaces being separated axially when the clutch is disengaged and in driving engagement with one another when the clutch is engaged.

7. The invention of claim 1, and camming means interconnecting the portions of said one member, said camming means being responsive to relative rotation between said portions to effect axial extension thereof.

8. The invention of claim 7, wherein said camming means includes rollers rotatably mounted on one of said portions and a tapered camming surface on the other portion.

9. The invention of claim 8, wherein said rollers are rotatable about an axis extending radially with respect to said one portion, said camming surface being tapered in a circumferential direction.

10. The invention of claim 7, wherein said camming means includes a recess having tapered walls in at least one of said portions, and force transmitting elements in said recess urged up said tapered walls to effect axial separation of said portions, and return springs yieldably urging said portions toward one another.

11. The invention of claim 7, wherein said camming means is a threaded connection between said portions, the lead of said threads comprising said threaded connection being opposite to the direction of rotation of said members.

12. In a clutch, a pair of relatively rotatable coaxial members comprising a driving member and a driven member, one of said members including a pair of axial extensible portions responsive to relative rotation between said portions to effect extension thereof to drivingly engage said members, a belt carried by the other member and rotatable therewith for engagement with one of said portions to effect relative rotation between said portions, said belt being responsive to the rotational velocity of said other member to engage said belt with said one portion when the rotational velocity of said other member is less than a predetermined level, temperature responsive means carried by said other member for forcing said belt into engagement with said one portion when the temperature level sensed by the temperature responsive means is above a predetermined level and to permit the belt to disengage from the one portion when the temperature level sensed by said temperature responsive means is below a predetermined level, means responsive to the rotational velocity of the other member and engaging said belt to yieldably urge the latter radially inward with respect to said other member, said last-mentioned means yielding from an initial position in response to pressure thereon due to radial outward movement of the belt in response to centrifugal forces generated by rotation of the other member, said temperature responsive means including structure engaging said belt to maintain the latter in engagement with said one member when the temperature sensed by the temperature responsive means attains the predetermined level, said structure including a lever pivotally mounted on said other member having a camming surface engaging said belt and said temperature responsive means including an expansion member which expands in response to temperature changes to pivot said lever into a condition whereby said camming surface holds said belt against said one member.

13. In a clutch, a pair of relatively rotatable coaxial members comprising a driving member and a driven member, one of said members including a pair of axial extensible portions responsive to relative rotation between said portions to effect extension thereof to drivingly engage said members, a belt carried by said other member and rotatable therewith for engagement with one of said portions to effect relative rotation between said portions, and temperature responsive means for engaging said belt with said one portion when the temperature level sensed by the temperature responsive means is above a predetermined level and to disengage the belt from the one portion when the temperature level sensed by said temperature responsive means is below said predetermined level, yieldable means carried by said other member for engaging said belt with said one member, said temperature responsive means including structure engaging said belt to maintain the latter in engagement with said one member when the temperature sensed by the temperature responsive means attains the predetermined level, said structure including a lever pivotally mounted on said other member having a camming surface engaging said belt and said temperature responsive means including an expansion member which expands in response to temperature changes to pivot said lever into a condition whereby said camming surface holds said belt against said one member.

* * * * *